US 10,109,895 B2

(12) United States Patent
Inoue

(10) Patent No.: US 10,109,895 B2
(45) Date of Patent: *Oct. 23, 2018

(54) BATTERY PACK

(71) Applicant: DENSO CORPORATION, Kariya, Aichi-pref. (JP)

(72) Inventor: Yoshimitsu Inoue, Chiryu (JP)

(73) Assignee: DENSO CORPORATION, Kariya (JP)

( * ) Notice: Subject to any disclaimer, the term of this patent is extended or adjusted under 35 U.S.C. 154(b) by 90 days.

This patent is subject to a terminal disclaimer.

(21) Appl. No.: 14/242,100

(22) Filed: Apr. 1, 2014

(65) Prior Publication Data

US 2014/0295224 A1  Oct. 2, 2014

(30) Foreign Application Priority Data

Apr. 1, 2013 (JP) .................. 2013-076204

(51) Int. Cl.
*H01M 10/625* (2014.01)
*H01M 10/6563* (2014.01)
*H01M 10/613* (2014.01)
*H01M 10/63* (2014.01)

(52) U.S. Cl.
CPC ..... *H01M 10/5067* (2013.01); *H01M 10/613* (2015.04); *H01M 10/625* (2015.04); *H01M 10/63* (2015.04); *H01M 10/6563* (2015.04)

(58) Field of Classification Search
CPC ......... H01M 10/5067; H01M 10/6563; H01M 10/625; H01M 10/63; H01M 10/613
USPC .......................................................... 429/62
See application file for complete search history.

(56) References Cited

U.S. PATENT DOCUMENTS

| 7,654,351 | B2 * | 2/2010 | Koike | B60K 1/04 |
| | | | | 180/68.1 |
| 2005/0077874 | A1 * | 4/2005 | Nakao | B60L 3/0046 |
| | | | | 320/116 |
| 2009/0195210 | A1 * | 8/2009 | Takeuchi | H01M 10/625 |
| | | | | 320/134 |

(Continued)

FOREIGN PATENT DOCUMENTS

| JP | 2008251378 A | * 10/2008 |
| JP | 2009-170370 | 7/2009 |

(Continued)

OTHER PUBLICATIONS

Machine Translation of JP 2008-251378 A.*

(Continued)

*Primary Examiner* — Jonathan G Jelsma
(74) *Attorney, Agent, or Firm* — Nixon & Vanderhye PC

(57) ABSTRACT

A battery pack constituted by accommodating a plurality of cells, which forms battery modules, in an internal space of a casing includes the cells, a heat radiating bus bar, the casing, and an internal blower. The plurality of cells is arranged side by side facing each other. A radiation bus bar radiates heat into the internal space from the cells. The casing has a box-like shape with at least six surfaces that surrounds and seals the cells and the internal space. An internal blower is disposed in the casing. The internal blower circulates the air in the casing so as to pass through an inner surface of the casing and a periphery of the cell including the radiation bus bar, and the heat is radiated to an outside from the inner surface of the casing.

15 Claims, 8 Drawing Sheets

(56) References Cited

U.S. PATENT DOCUMENTS

| | | | | |
|---|---|---|---|---|
| 2011/0076540 A1* | 3/2011 | Ronning | ............ | H01M 10/5067 |
| | | | | 429/120 |
| 2012/0196157 A1* | 8/2012 | Krestel | ............... | H01M 2/1072 |
| | | | | 429/7 |
| 2015/0357692 A1* | 12/2015 | Piggott | ............. | H01M 10/6572 |
| | | | | 320/107 |

FOREIGN PATENT DOCUMENTS

| | | |
|---|---|---|
| JP | 2009-211829 | 9/2009 |
| JP | 2010-033799 | 2/2010 |

OTHER PUBLICATIONS

Office Action (2 pages) dated Apr. 7, 2015, issued in corresponding Japanese Application No. 2013-076204 and English translation (2 pages).

* cited by examiner

BATTERY PACK

CROSS-REFERENCE TO RELATED APPLICATION

This application is based on and claims the benefit of priority from earlier Japanese Patent Application No. 2013-76204 filed Apr. 1, 2013, the description of which is incorporated herein by reference.

TECHNICAL FIELD

The present disclosure relates to a battery pack composed by connecting a plurality of cells that forms a battery module. In particular, the present disclosure relates to a temperature adjustment structure for the battery pack that stores electric power for driving a vehicle.

BACKGROUND

A cooling method is known for a battery pack that accommodates cells, having a blower inside a casing where a heat exchanger performing a refrigeration cycle is provided, controlling the temperature inside the casing by the heat exchanger that is temperature-controlled using a cooling capacity of the refrigeration cycle.

This method is expensive and the structure is complicated because it requires the refrigeration cycle.

That is, the overall cost of the system increases and it becomes an obstacle to production or sales when the refrigeration cycle is required.

Further, since there are entry and exit points for refrigerant pipes in addition to wires, special treatments and structures are required for securing tightness, thus resulting with further increase in cost.

Therefore, as disclosed in Japanese Patent Application Laid-Open Publication No. 2010-33799, an electric power storage device that allows air to flow inside the battery pack from the outside has been used.

The device in the Publication '799 has a plurality of electric power storage units, and disposes a first electric power storage unit and a second electric power storage unit side by side for efficiently adjusting the temperature of electric power storage modules in each electric power storage unit.

Further, each electric power storage unit in the electric power storage device of the Publication '799 has the electric power storage module having a plurality of storage elements, and a supply duct that supplies a heat exchange medium, which exchanges heat between the storage elements, to the electric power storage module.

Moreover, each electric power storage unit has a discharge duct for discharging the heat exchange medium that has exchanged heat with the storage elements.

Then, the exhaust ducts of the first and second electric power storage units arranged side by side.

As a result, in the Publication '799, air sucked from the outside flows between the cells, and the air is discharged to the outside from an exhaust passage.

However, according to a techniques disclosed in the Publication '799, since the air-cooled battery pack that cools the cells with air is cooled in a so-called open type, noise occurs and propagates outside as a trade-off of the cooling.

Further, dust enters easily into the battery pack. Furthermore, condensation easily occurs inside the battery pack.

Moreover, there is a problem that it is necessary to consider the effect of exhaust air in order to ensure comfort.

SUMMARY

An embodiment provides a battery pack of sealed type that accommodates cells within a sealed inner space that can radiate heat generated from the cells efficiently to the open air.

Disclosed contents of the Publication cited in the background may be introduced or invoked by reference for explaining technical elements disclosed in the present specification.

In a battery pack according to a first aspect, the battery pack comprised of a plurality of cells, which forms battery modules, in an internal space of a casing includes heat radiation means for radiating heat from the cells into the internal space, the casing having at least six surfaces, the casing that surrounds and seals the cells and the internal space, and an internal blower disposed in the casing.

The internal blower circulates fluid in the casing so as to pass within the casing and a periphery of the cell including the heat radiation means, and the heat is radiated to outside from the inner surface of the casing.

According to the present disclosure, the fluid circulating inside the casing by the internal blower flows from all directions around the cells in the casing, and the heat is transferred from the cells into the internal space via the heat radiation means.

Then the heat is transferred to the entire inner surface of the casing, and by radiating the heat to the outside from the entire inner surface of the casing, it becomes possible to cool the cells.

In the battery pack according to a second aspect, the internal blower circulates the fluid without fluid leaking out of the casing.

In the battery pack according to a third aspect, the heat radiation means for radiating heat from sides of the cells is composed at least one of a heat radiating plate disposed contacting to the cells, a heat radiating bus bar electrically connected to the cells, or the sides of the cells themselves.

In the battery pack according to a fourth aspect, there is further provided a controller for controlling the internal blower, the controller controls the internal blower so that the fluid flowing at a first flow rate flows from the internal blower when the temperature of the cell is raised by a self-heating of the cell, and the controller controls the internal blower so that the fluid flowing at a second flow rate with larger flow rate than the first flow rate flows from the internal blower when lowering the temperature of the cell.

In the battery pack according to a fifth aspect, the second flow rate is larger than a predetermined flow rate.

In the battery pack according to a sixth aspect, there is further provided a cover that covers a part of an outer periphery of the casing, and an external blower that blows the air within an outer gap formed between the cover and an outer surface of the casing.

In the battery pack according to a seventh aspect, the outer gap is formed between the cover that covers one of the six surfaces of the casing and the surfaces of the casing.

In the battery pack according to an eighth aspect, a DC-DC converter is disposed in a part of the outer gap, and the DC-DC converter is cooled by the external blower.

DETAILED DESCRIPTION OF THE PREFERRED EMBODIMENTS

Figure 1:
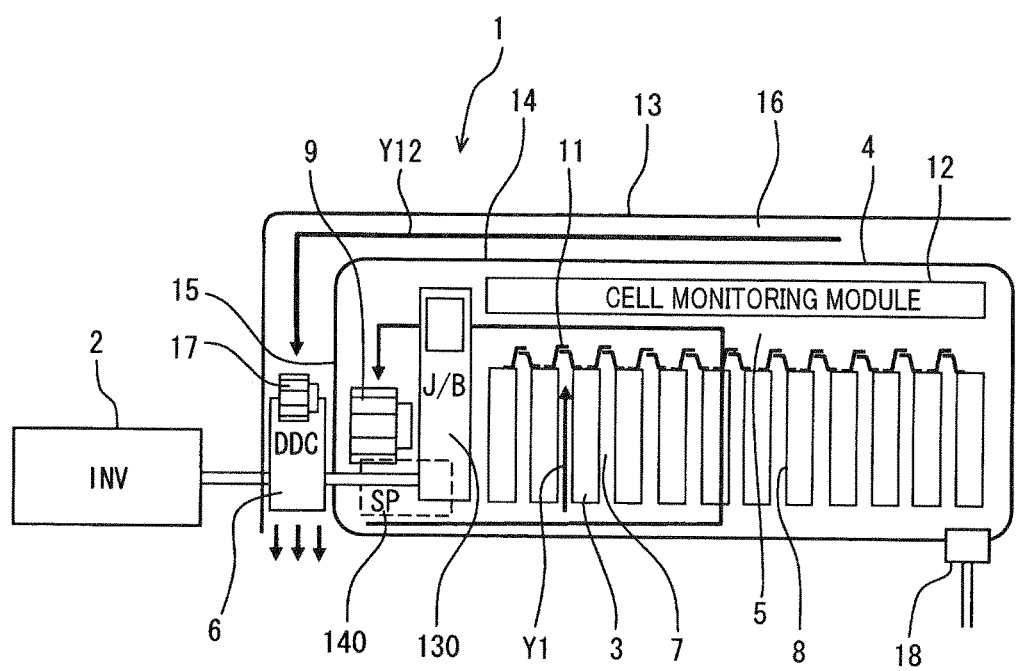
FIG. 1 shows a partially sectional schematic view of a connecting portion of a battery pack and an inverter in a first embodiment of the present disclosure.

With reference to the accompanying drawings, hereinafter will be described a plurality of embodiments of the present disclosure.

The same reference numerals are given to components corresponding to components described in the preceding embodiment in every embodiment and explanations will be omitted in some cases.

When only a part of the structure is explained in each embodiment, other embodiments described antecedently may be applied for the rest of the structure.

Not only the combination of portions specified that the combination is concretely possible with each embodiment, but the embodiments may be partially combined even if not specified clearly as long as no particular problem arises about the combination.

[First Embodiment]

Hereinafter, a first embodiment of the present disclosure will be explained in detail with reference to FIG. 1.

FIG. 1 shows a connecting portion of a battery pack 1 and an inverter 2 in a first embodiment of the present disclosure.

The battery pack 1 is constituted by accommodating a plurality of cells 3, which forms battery modules, in an internal space 5 of a casing 4.

The battery pack 1 is connected to the inverter 2 through a DC-DC converter 6 (referred to as DDC in FIG. 1). The DC-DC converter 6 converts AC output of the inverter 2 to appropriate DC voltage.

Gaps 7 are disposed between a plurality of cells 3, and the cells 3 are arranged side by side.

Side surfaces 8 of the cells 3 form parts of heat radiation means for radiating heat from the cells 3 into the internal space 5.

The side surfaces 8 of the cells 3 are opposed to each other through the gap 7, and air as fluid flows between the cells 3 as shown by an arrow Y1.

The casing 4 is made of steel or aluminum plates and has a box-like shape with at least six surfaces. The casing 4 surrounds and seals the cells 3, and although not shown in FIG. 1, a sealed space 5 is formed inside the casing 4 by joining an upper casing and a lower casing.

Further, it is desirable that unevenness is formed on either inner or outer surface of the casing 4 in order to increase a heat radiation area.

An internal blower 9 is disposed in the casing 4. The internal blower 9 may be formed by an axial fan or a sirocco fan.

The internal blower 9 circulates the air in the casing 4 so as to pass through the inner surface of the casing 4, the surfaces of the cells 3, and the gaps 7.

Thereby the heat generated in the cells 3 is radiated to the outside from the entire inner surface of the casing 4.

The internal blower 9 circulates the air without leaking the air (the fluid) out of the casing 4. Therefore, the casing 4 does not have either an inlet or an outlet for the fluid. The fluid flowing through the internal blower 9 is circulated inside the casing 4 by the internal blower 9.

Another heat radiation means of the cells 3 is composed of bent heat radiating bus bars 11 (bent bus bars) for heat radiation that are connected to the cells 3.

The bent bus bars 11 are made of conductive metal plates and configured to electrically connect the adjoining cells 3.

The bent bus bars 11 are formed greatly bent to a mountain-shape so as to have a length greater than a length normally required for the connection.

The internal blower 9 is controlled by a controller built in a cell monitoring section (cell monitoring module) 12.

Since the 12 cell monitoring module is monitoring the temperature of the cells 3, a rotational speed of the internal blower 9 is controlled based on the monitored temperature of the cells 3.

The cell 3 self-heats when current is discharged (output) from the battery pack 1 and when current is charged (input) into the battery pack 1.

When increasing the temperature of the cells 3 by the self-heating of the cell 3, either the internal blower 9 is operated so that air flowing at a first flow rate flows from the interior blower 9, or the internal blower 9 is stopped.

On the other hand, when lowering the temperature of the cells 3 by cooling the cells 3, the internal blower 9 is operated so that air flowing at a second flow rate, which is larger than the first flow rate flows from the internal blower 9.

In order to produce a turbulence effect, the second flow rate has an flow rate more than a predetermined flow rate that is determined by experiment (including simulations) in advance.

If the flow rate from the internal blower 9 is small, the air may hit only parts of the cells 3, or the distribution of the air may become uneven.

As the flow rate increases, the air hits different parts of the casing 4 and becomes turbulent, thus it becomes possible to cool the group of cells 3 evenly. This will be referred to as a turbulence effect in the present disclosure.

The flow rate may be further increased; however, the power consumption of the internal blower 9 will also increase.

Therefore, in order to cool the group of cells 3 evenly, a minimum flow rate that can produce the turbulence effect is obtained in advance by experiments.

A cover 13 that covers a part of an outer periphery of the casing 4 is provided, and at least an inner surface of the cover 13 is made flat.

Further, the cover 13 has a cross section that covers two adjoining surfaces 14 and 15 of the casing 4 in a bent shape.

An external blower 17 that blows the air as shown by an arrow Y12 is disposed in an outer gap 16 formed between the inner surface of the cover 13 and the outer surface of the casing 4.

Since the outer gap 16 is a relatively simple air passage, the air flows into the outer gap 16 smoothly when the external blower 17 rotates. In other words, ventilation resistance is small.

It is generally known that the noise of the blower is small when the air flows in a part where the ventilation resistance is small.

Therefore, in order to reduce noise, it is desirable to form the outer gap 16 between the flat cover 13 that covers one of the six surfaces of the casing 4 and at least the other surface 14 of the casing 4.

The cell monitoring module 12 that forms the cell monitoring section for monitoring at least the voltage and the temperature of the cells 3, a junction box (J/B) 130, and a service plug (SP) 140 are built in the casing 4.

The junction box 130 is a current controlled device for connecting predetermined connection terminals of the cells 3 constituting a battery module group, and accommodates a relay that turns on and off the current flowing through the current lines and a resistor in an insulating cover.

The service plug 140 is a current controller for connecting the predetermined connection terminals of the cells 3, and is an extraction type plug that can render the groups of cells 3 connected to the current line non-conductive and conductive.

The service plug 140 is a switch for de-energizing a circuit of the battery pack 1 during maintenance, for example.

When the service plug 140 is unplugged, it becomes visible from outside a condition in which current is not flowing, and is able to forcibly break the circuit of the battery pack 1.

A base portion of the service plug 140 is fixed to the casing 4 in a form of a plug including an extractable handle portion exposed to the outside of the casing 4.

Although not shown in FIG. 1, a wiring of a temperature sensor for detecting the temperature of the cells 3 is disposed between the cells 3 and the cell monitoring module 12.

In addition, a wiring of a voltage sensor for detecting the voltage of the cells 3 is disposed between the heat radiating bus bars 11 and the cell monitoring modules 12.

Incidentally, the original purpose of the bus bar for radiating is to connect the cells 3 electrically from one another to form a battery assembly.

Since the casing 4 is sealed, dust or the like is prevented from entering, and it is possible to prevent inside the casing 4 from condensing.

The casing 4 is configured to discharge gas or the like generated inside the casing 4 to outside thereof through a pressure valve (relief valve) 18.

Next, the control of the internal blower 9 is explained.

Figure 2:
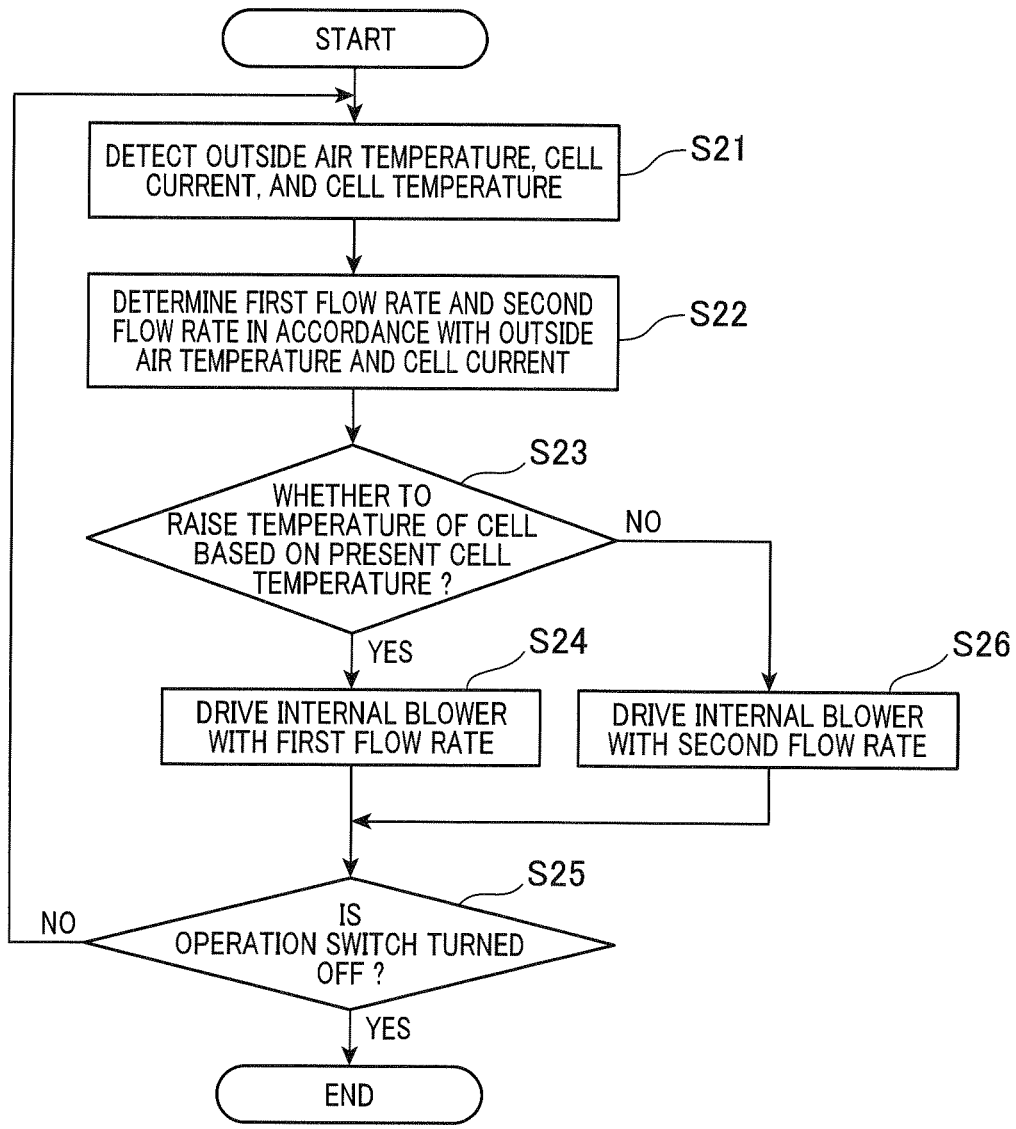
FIG. 2 shows a flowchart of an internal blower control of the battery pack in the first embodiment.

In FIG. 2, when the control starts, the outside air temperature, which is the temperature outside the vehicle, is detected from a value of an outside air temperature sensor in a step S21.

Further, current of the cell (hereinafter referred as the cell current), the temperature of each cell, and an average temperature of the cell 3 groups are also detected.

Next, the first flow rate and the second flow rate are obtained from a control map in accordance with the outside air temperature and the cell current in step S22.

Air flowing at the first flow rate has flow rate weaker than that of air flowing at the second flow rate.

Since heat radiation from the casing 4 becomes more difficult as the outside air temperature is high, the first flow rate and the second flow rate become increased.

A reason for obtaining the first flow rate and the second flow rate in accordance with the cell current will be described later.

The flow rate of the second flow rate is sufficient enough to generate the turbulence effect within the casing so that the heat of the cell 3 radiates from the surface of the casing 4 evenly.

The control map used in the step S22 is determined experimentally in advance.

Next, the cell temperature at the present time (present cell temperature) is compared with an appropriate temperature level of the cell, and it is determined whether or not to raise the temperature of the cell in a step S23.

When it is determined to raise the temperature of the cell (when YES), the driving voltage with a level that outputs the first flow rate is applied to a driving motor of the internal blower 9 at a step S24. Thereby, the internal blower 9 is driven with the first flow rate.

Thus, the amount of heat radiated through the casing 4 is reduced, and when the amount of heat generated by the group of the cells 3 is greater than the heat radiation, the temperature of the cells 3 increases.

When the temperature of the cell 3 is lower than the proper temperature, the efficient battery can be obtained by raising the temperature of the cell 3, for example.

Whether the temperature of the cell 3 rises or not is also related not only to the amount of heat radiation, but to the amount of the current flowing in the cell 3 (self-heating amount of the cell).

Accordingly, the first flow rate and the second flow rate are determined in accordance with the outside air temperature and the cell current in the step S22.

Next, it is determined whether or not an operation switch (ignition switch) is turned off in a step S25.

When the operation switch is turned off, then the control is finished, otherwise the process returns to the step S21.

When it is determined not to raise the temperature of the cell (when NO) in the step S23, the driving voltage with a level that outputs the second flow rate is applied to a driving motor of the internal blower 9 at a step S26. Thereby, the internal blower 9 is driven with the second flow rate.

As a result, the amount of heat radiated through the casing 4 is increased and the turbulence effect is produced inside the casing 4.

Even when the difference between the maximum temperature and the minimum temperature of the plurality of cells 3 is large and it is determined that the variation in the temperature is large between the group of cells 3, it is determined NO in the step S23.

When the amount of heat generated by the group of cells 3 is fewer than the amount of heat radiated, the temperature of the cell 3 decreases.

When the temperature of the cell 3 is higher than the proper temperature, the efficient battery can be obtained by lowering the temperature of the cell 3, for example.

Whether the temperature of the cell 3 drops or not is also related not only to the amount of heat radiation, but to the amount of the current flowing in the cell 3.

Accordingly, the second flow rate is determined in accordance with the outside air temperature and the cell current in the step S22.

Further, even when the temperature difference is large, such as the temperature of a particular cell 3 is high and another cell 3 is low, the temperature of the cells 3 in the casing 4 is evened by the turbulence effect caused by air flowing at the second flow rate.

[Function and Effect of the First Embodiment]

The battery pack 1 constituted by the plurality of cells 3 which forms the battery module in the internal space 5 of the casing 4 in the first embodiment is provided with the heat radiation means 11, the casing 4, and the internal blower 9.

The plurality of cells 3 is arranged side by side facing each other. The heat radiation means 11 radiates heat from the cell 3 into the internal space 5.

The casing 4 has the box-like shape and at least six surfaces. The casing 4 surrounds and seals the cells 3 and the internal space 5. The internal blower 9 is disposed in the casing 4.

The internal blower 9 circulates the fluid in the casing 4 so as to pass through the inner surface of the casing 4 and the periphery of the cell 3 including the heat radiation means 11, and the heat is radiated to the outside from the inner surface of the casing 4.

Accordingly, the fluid circulating inside the casing 4 by the internal blower 9 flows from all directions around the cells 3 in the casing 4, and heat is transferred from the cells 3 into the internal space 5 via the heat radiation means 11.

Then the heat is transferred to the entire inner surface of the casing 4, and by radiating the heat to the outside from the entire inner surface of the casing 4, it becomes possible to cool the cells 3.

Further, the internal blower 9 circulates the fluid without leaking the fluid out of the casing 4. Therefore, it is possible to radiate the heat effectively from the six surfaces of the casing 4. Then, it is possible to prevent smoke or noise from leaking in an unintended manner from the casing 4.

Further, the casing 4 does not have either an inlet or an outlet of the fluid, and the fluid flowing through the internal blower 9 is circulated inside the casing 4 by the internal blower 9.

Accordingly, since the casing 4 seals and surrounds the cells 3, there is no sound leaking outside.

In addition, there is no possibility that dust enters into the casing 4. Further, there will be no condensation inside the casing 4.

Next, the heat radiation means is composed of the heat radiating bus bar 11 that is electrically connected to the cell 3.

Accordingly, the cell 3 radiates the heat through the heat radiating bus bar 11, it is possible to increase the heat radiation capability of the cell 3.

Further, the controller for controlling the internal blower 9 is provided in the cell monitoring module 12.

The controller controls the internal blower 9 so that air flowing at the first flow rate flows from the internal blower 9 when the temperature of the cell 3 is raised by the self-heating of the cell 3.

The internal blower 9 is controlled so that air flowing at the second flow rate with larger flow rate than air flowing at the first flow rate flows from the internal blower 9 when lowering the temperature of the cell 3 by cooling the cell 3.

Accordingly, since the blower is operated with relatively low flow rate when heating the cell 3, it is possible to raise the temperature of the cell to prevent the heat from radiating outside.

Further, the second flow rate is the predetermined flow rate or more that is determined by experiment in advance.

Therefore, the fluid circulating inside the casing 4 by the internal blower 9 flows evenly from all directions around the cells 3 in the casing 4.

Thus, the heat is transferred through the heat radiation means 11 evenly into the internal space 5 from the cell 3.

It becomes possible to cool the cells 3 evenly by the heat being transferred evenly to the inner surface of the casing 4 and being efficiently radiated to the outside from the inner surface of the casing 4.

Next, the cover 13 that covers the part of the outer periphery of the casing 4 and the external blower 17 that blows air to the outer gap 16 formed between the cover 13 and the outer surface of the casing 4 are provided.

Accordingly, it becomes possible to cool the casing 4 by forcibly flow the air along the surface of the casing 4 by the external blower 17 in situations where the air is not easily flowing on the outer surface of the casing 4.

Further, the outer gap 16 is formed between the flat cover 13 that covers one of the six surfaces of the casing 4 and the surface of the casing.

Therefore, the outer gap 16 forms the air passage with the small ventilation resistance, thus it is possible to reduce the noise of the external blower 17.

Further, the DC-DC converter 6 is disposed in a part of the outer gap 16, and the DC-DC converter 6 is cooled by the external blower 17.

Therefore, it is possible to cool the casing 4 of the battery pack 1 and the DC-DC converter 6 by the external blower 17.

[Second Embodiment]

Next, a second embodiment of the present disclosure will be explained.

It should be appreciated that, in the second embodiment and the subsequent embodiments, components identical with or similar to those in the first embodiment are given the same reference numerals, and structures and features thereof will not be described in order to avoid redundant explanation.

Figure 3:
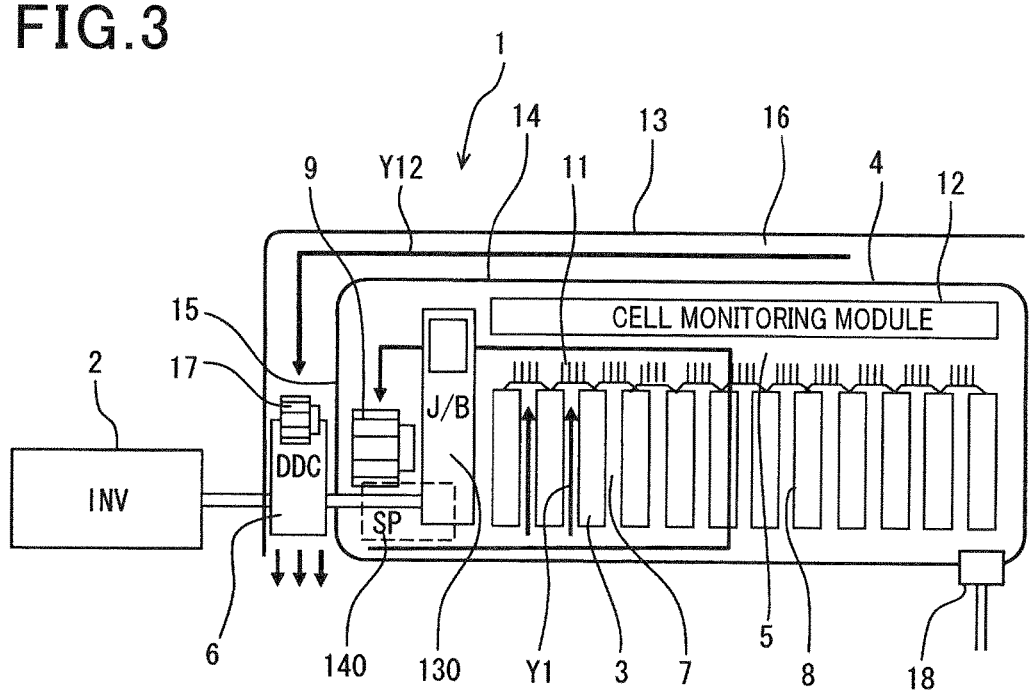
FIG. 3 shows a partially sectional schematic view of a connecting portion of a battery pack and an inverter in a second embodiment of the present disclosure.

FIG. 3 shows a connecting portion of the battery pack 1 and the inverter 2 according to the second embodiment of the present disclosure.

In FIG. 3, the heat radiation means of the cell 3 is composed of heat radiating bus bars 11 with fins formed thereon (fin-formed bus bars).

In order to construct the fin-formed bus-bars 11 by forming the fins on the bus bars, the fins may be formed by forging or cut-and-raising the copper members that constitute the bus bars. Further, the separately prepared fins may be joined (welded) to the bus bars.

[Third Embodiment]

Next, a third embodiment of the present disclosure will be explained.

Particularly, parts different from the previously-mentioned embodiments will be explained.

Figure 4:
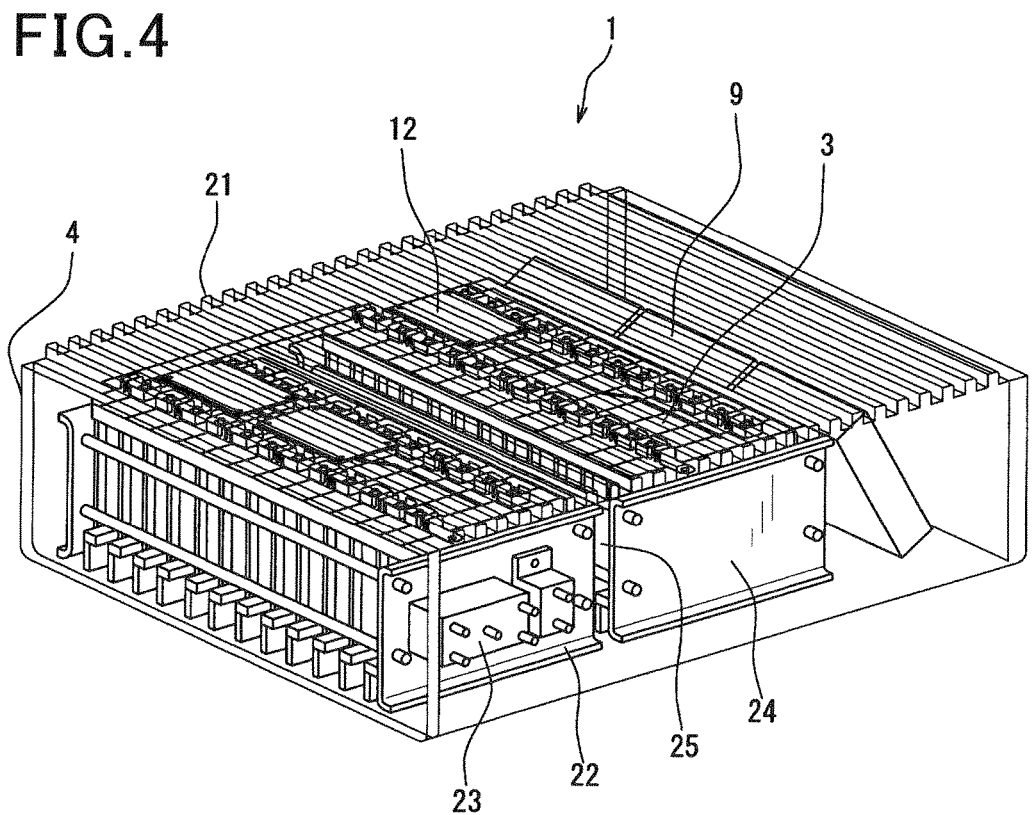
FIG. 4 shows a transparent perspective view of an inner structure and an internal structure of a battery pack in a third embodiment of the present disclosure.

FIG. 4 shows an appearance and an inner structure of the battery pack 1 in a perspective view according to the third embodiment of the present disclosure.

As shown in FIG. 4, the casing 4 of the battery pack 1 is a cuboid with six surfaces.

The casing 4 is formed with fine wave-formed uneven portions 21 on a top of it, and has good heat radiation from the outer surface of the casing 4.

The battery pack 1 is constituted by accommodating a plurality of cells 3, which forms battery modules, in an internal space of a casing 4.

The plurality of cells 3 is divided into two groups of a first module 22 and a second module 24 when accommodated.

The total volume of the first module 22 and the second module 24 is 37.23 liters. In addition, a total capacity of the first module 22 and the second module 24 is 1.91 kwh.

A gap-between-modules 25 where air flows is present between the first module 22 and the second module 24.

The cell has an output characteristic of 3.7 volts, 21.5 Ah. Twelve cells are accommodated in each first and second modules 22, 24.

Figure 5:
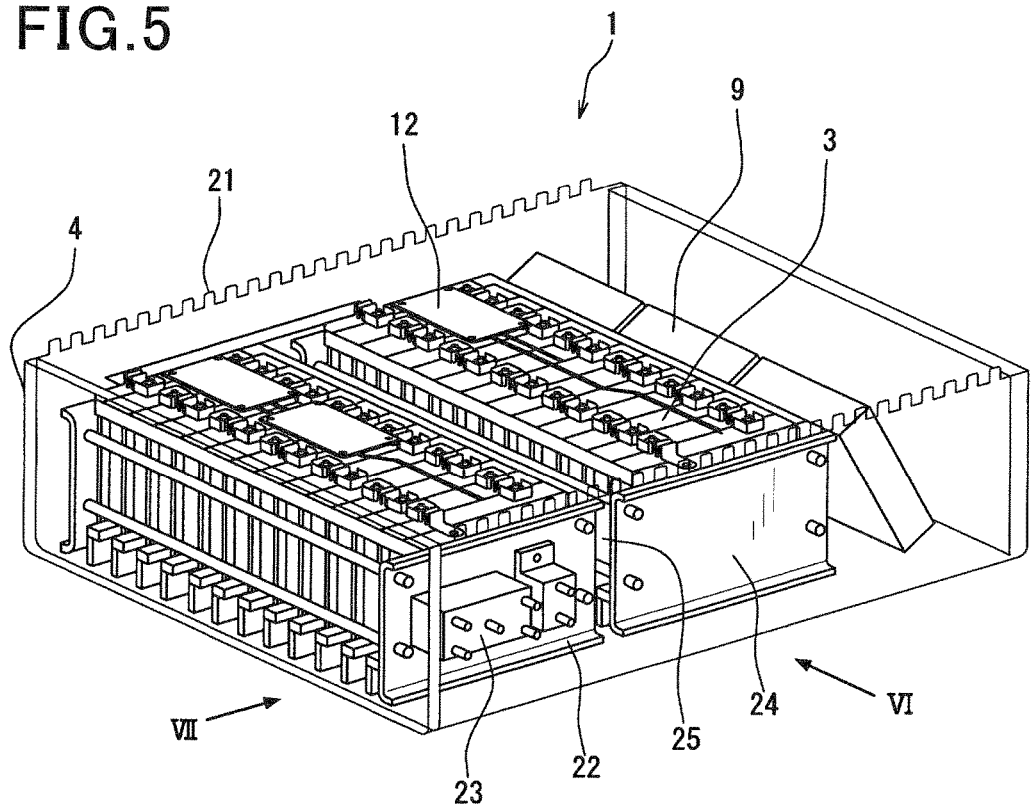
FIG. 5 shows a transparent perspective view of the internal structure for easily understanding the internal structure by omitting a part of an upper surface of a casing in the third embodiment.

FIG. 5 shows the third embodiment for easily understanding an internal structure by omitting a part of an upper surface of the casing 4.

A relay 23 is provided on a side surface of the first module 22. Further, cell monitoring circuit boards constituting the cell monitoring section 12 that monitors at least the temperature and voltage of the cells 3 are provided above the first module 22 and the second module.

The internal blower 9 is provided by being divided into three pieces, and is formed of an axial flow fan that is disposed at a slant.

The internal blower 9 circulates the air without it leaking out of the casing 4.

That is, the casing 4 does not have either an inlet or an outlet of the air, and the air flowing through the internal blower 9 is circulated inside the casing 4.

When raising the temperature of the cells 3 by the self-heating of the cells 3, either the internal blower 9 is operated so that air flowing at the first flow rate is blown out from the internal blower 9 or the internal blower 9 is stopped.

When lowering the temperature of the cells 3 by cooling the cells 3, the internal blower 9 is operated so that air flowing at the second flow rate having greater flow rate than the first flow rate is blown out.

Air flowing at the second flow rate has an flow rate more than a predetermined flow rate that is determined by experiments.

Figure 6:
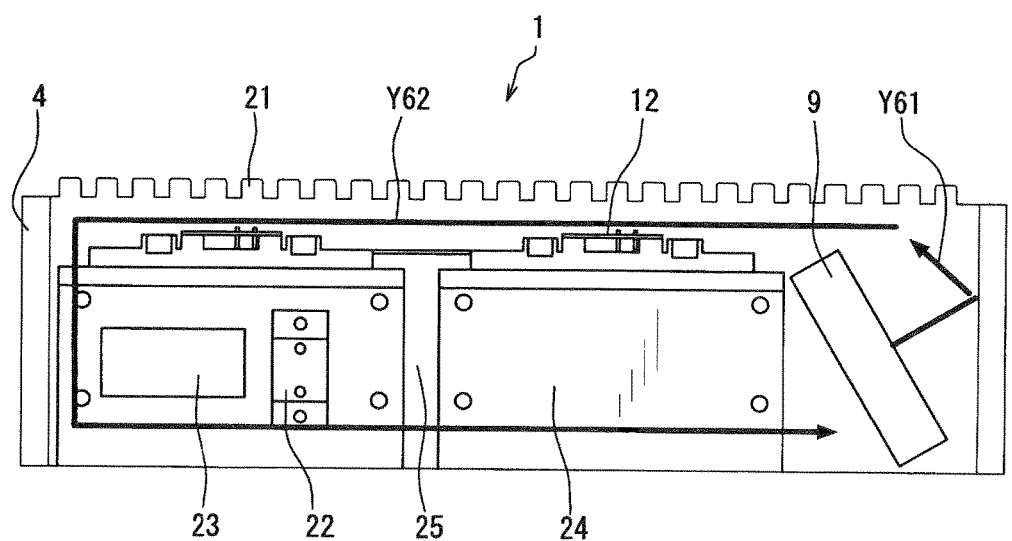
FIG. 6 shows an internal transparent view of a side of the casing as seen from a direction of an arrow VI in FIG. 5.

FIG. 6 shows a side of the casing 4 as seen from a direction of an arrow VI in FIG. 5.

A part of the air from the internal blower 9 exits from the front of the internal blower 9 and hits the inner surface of the casing 4, and basically, flows along a ceiling surface and a bottom surface of the casing 4 as arrows Y61, Y62, then returns to the back of the internal blower 9.

However, during the cooling of the cells 3 when the air rebounding from the inner surface of the casing 4 becomes a turbulent flow.

Uneven portions 21 for increasing the heat generation area are processed on an outer surface of the casing 4 when the casing 4 is formed.

The casing 4 has a box-like shape and at least six surfaces. The casing 4 surrounds and seals the cells 3, and the internal blower 9 disposed in the casing 4 circulates the air as a fluid in the casing 4 so as to pass along the inner surface of the casing 4, the periphery of the cell 3, and the gap between the modules 25.

Figure 7:
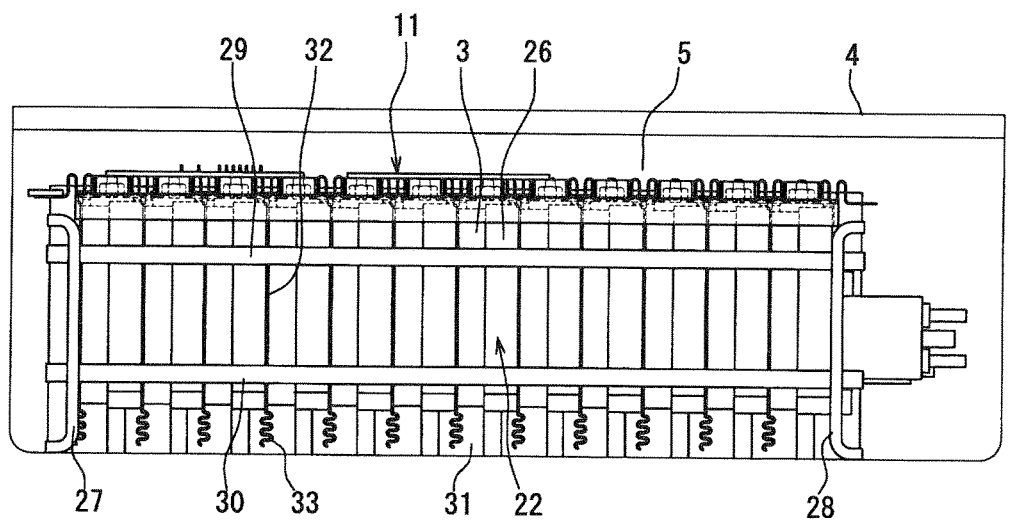
FIG. 7 shows an internal transparent view of a side of the casing as seen from a direction of an arrow VII in FIG. 5.

FIG. 7 shows a side surface of the casing 4 as seen from a direction of an arrow VII in FIG. 5.

That is, FIG. 7 removes the side of the casing 4 to show the front of the first module 22, which is a group of cells 3, inside the casing 4 visible.

Figure 8:
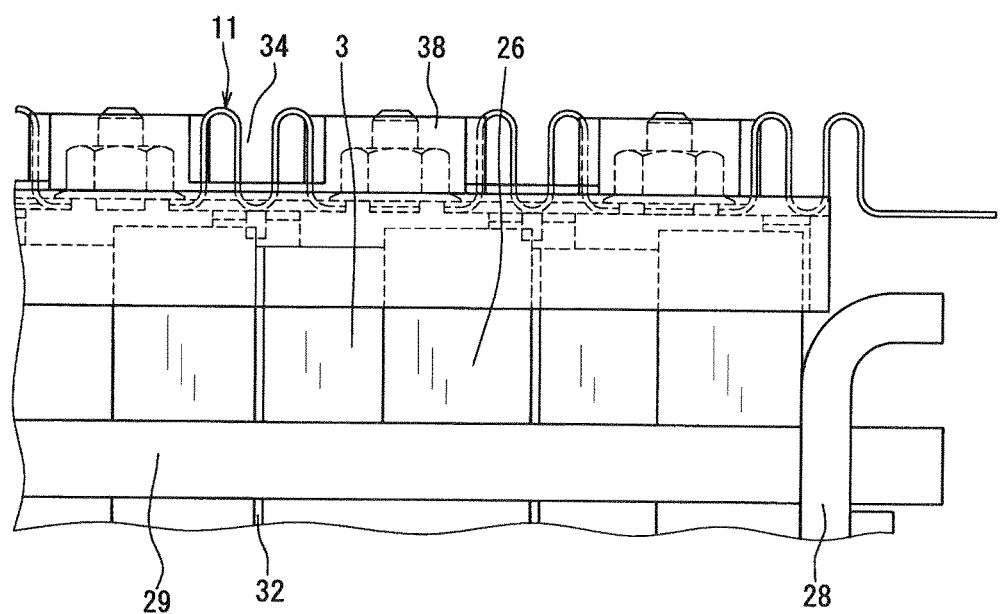
FIG. 8 shows an enlarged view of a part of a top of a cell in FIG. 7.
Figure 9:
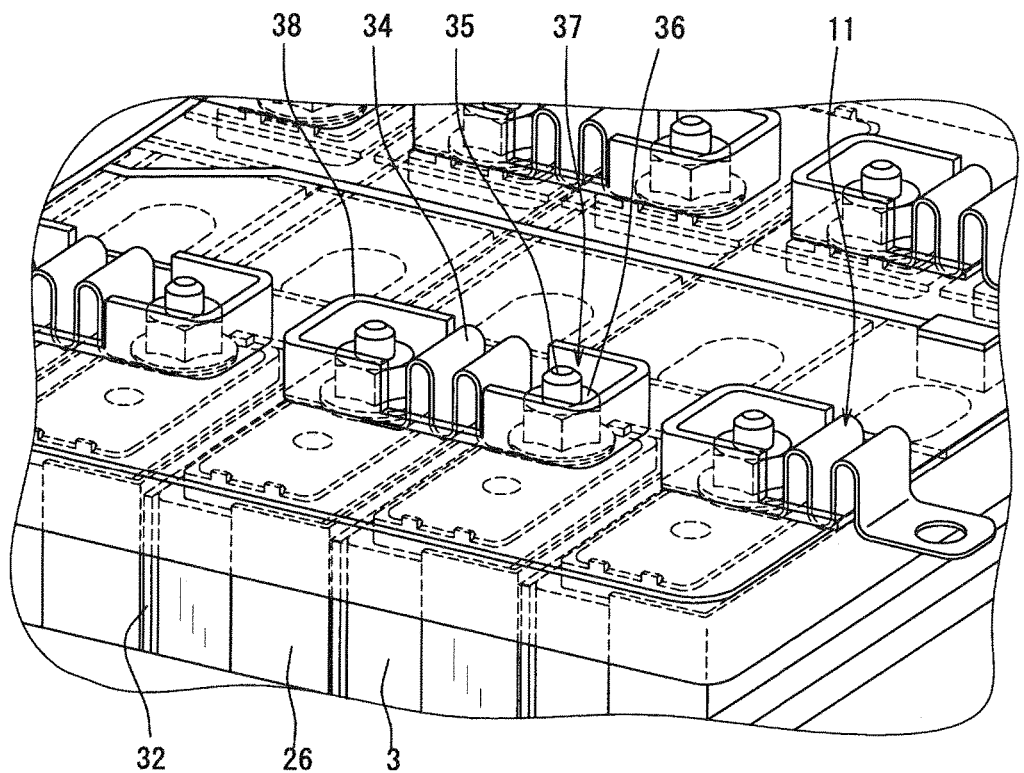
FIG. 9 shows an enlarged perspective view of the part of the top of the cell in FIG. 7.
Figure 10:
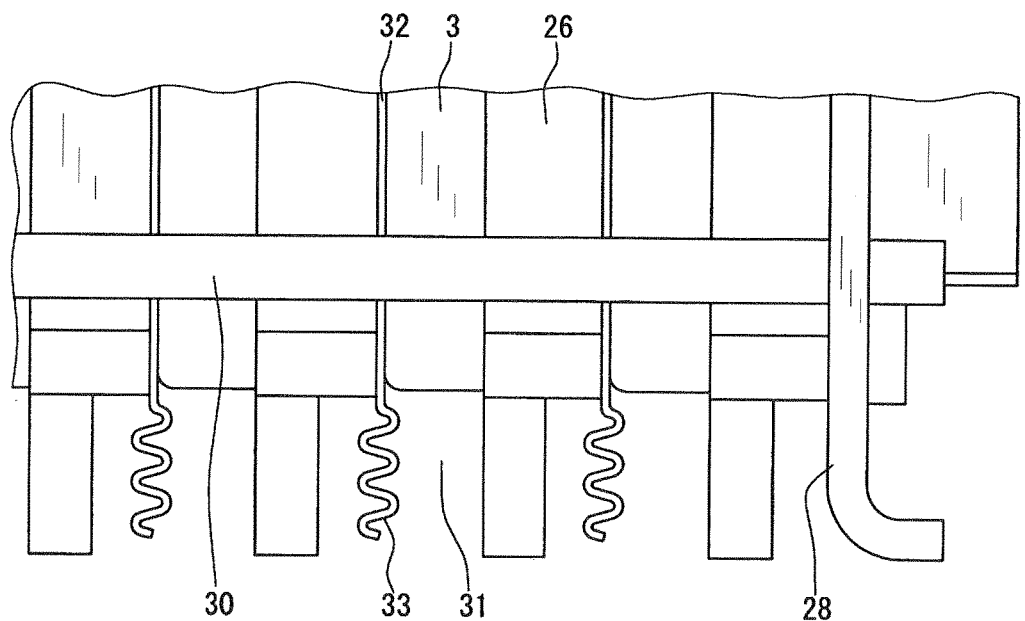
FIG. 10 shows an enlarged view of a part of a bottom of the cell in FIG. 7.

FIG. 8 and FIG. 9 show enlarged parts of the top of the cell in FIG. 7. FIG. 10 shows an enlarged part of the bottom of the cell in FIG. 7.

In FIG. 7, each cell 3 is held by a resin member 26 that wraps around a half portion of each cell 3.

Therefore, the resin member 26 is interposed between the adjoining cells 3, and the adjoining cells are insulated.

The surfaces of the cells 3 are formed of conductive members, and are electrified.

A plurality of cells 3 are sandwiched between a pair of strong pressing plates 27, 28.

Two through shafts 29, 30 connect between the pressing plates 27, 28 and sandwich the plurality of cells 3 so that the expansion of the cells during heat-generating is suppressed. Efficiency of the battery decreases when the cells 3 are expanded.

A plurality of air passages 31 are formed in a bottom part of the casing 4 as shown in FIG. 7. A heat radiating plate 32 made of aluminum exists on the surface of each cell 3 contacting to the surface thereof.

The heat radiating plates 32 are held together with the cells 3 by being sandwiched between the pair of the pressing plates 27, 28. The heat is transferred from the surface of the cell 3 to the heat radiating plate 32.

A part of the heat radiating plate 32 is extended into the air passage 31. A part of the heat radiating plate 32 is bent in a wave shape to form a heat radiating bent portion 33 so that the heat radiating plate 32 heat-exchanges with the air flowing through the air passage 31 efficiently within the air passage 31.

As shown in FIG. 8, a heat radiating bus bar 11 that connects between the cells is formed by being bent in an M-shape.

An M-shaped bent portion 34 of the bus bar 11 forms a heat radiation means 34 for radiating heat to the internal space 5 (FIG. 7) from the cells 3.

That is, the heat radiation means 34 of the cell 3 is composed of the curved M-shaped bent portion 34 for heat radiation connected to the cell 3.

FIG. 9 shows an enlarged part of the top of the cell in FIG. 8

An electrode part 37 having a shape of a bolt 35 and a nut 36 are disposed on the cell 3. The bus bar 11 with the M-shaped bent portion 34 connects between the adjoining electrode parts 37.

Further, three sides around the electrode part 37 is surrounded by a U-shaped covering portion 38 which is integrated with the resin member 26.

As shown in FIG. 8, the M-shaped bent portion 34 of the bus bar 11 is positioned between the U-shaped covering portions 38 facing each other. Thereby, the air flow from the internal blower 9 is blocked by the U-shaped covering portion 38. That is, the U-shaped covering portion 38 effects as a baffle plate to the air flow.

Accordingly, the air hits strong to the M-shaped bent portion 34 of the bus bar 11 located between the U-shaped covering portions 38.

Thereby, the heat radiation effect of the M-shaped bent portion 34 of the bus bar 11 is increased further.

FIG. 10 shows an enlarged view of a part of the bottom of the cell 3 in FIG. 7.

As described above, the heat radiating plate 32 made of aluminum is provided on the surface of each cell 3 contacting to the surface thereof. The heat is transferred from the surface of the cell 3 to the heat radiating plate 32.

The part of the heat radiating plate 32 is extended into the groove-like air passage 31. The part of the heat radiating plate 32 is bent in the wave shape to form the heat radiating bent portion 33 so that the heat radiating plate 32 heat-exchanges with the air flowing through the air passage 31 efficiently within the air passage 31.

Figure 11:
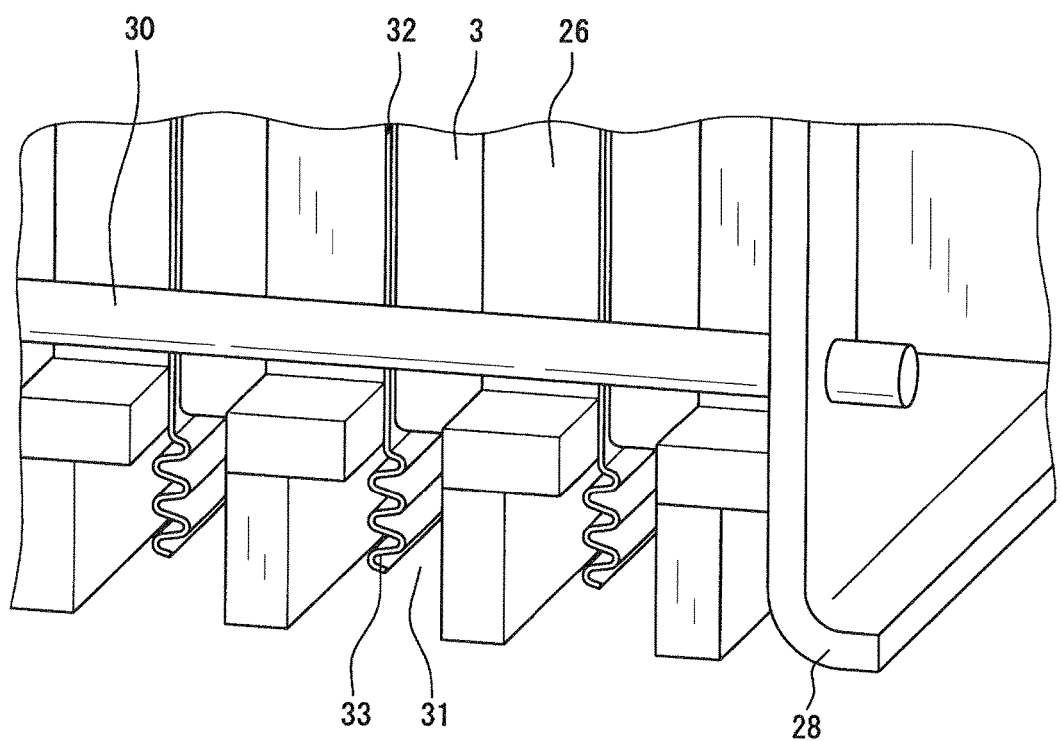
FIG. 11 shows a perspective view of a portion shown in FIG. 10.

FIG. 11 shows a perspective view of a portion shown in FIG. 10.

The heat radiating bent portion 33 in which the radiating plate 32 is bent in the wave shape is obtained by forming a part of the heat radiating plate 32 in a wave shape by a press.

The air flow indicated by the arrow Y62 in FIG. 6 mainly flows a periphery of the heat radiating bent portion 33 so that the heat radiating plate 32 is cooled, and thus, the cell 3 to which the heat radiating plate 32 contacts is cooled.

[Function and Effect of the Third Embodiment]

According to the third embodiment, the heat radiation means is composed of the heat radiating plates 32 disposed contacting to the cells 3 or the heat radiating bus bars 11 electrically connected to the cells 3 in order to radiate heat from the sides 8 of the cells 3.

Accordingly, since the cells 3 radiate via the heat radiating bus bars 11 or the heat radiating plates 32, it is possible to increase the heat transfer capability of the cells 3.

[Other Embodiments]

Although the preferred embodiments of the present disclosure are described in the embodiments described above, the present disclosure is not limited in any way to the embodiments described above, and may be implemented in various modifications without departing from scopes of the present disclosure.

The structures of the embodiments described above are simply examples, and the scopes of the present disclosure are not intended to be limited to the scopes of the description.

The scopes of the present disclosure are indicated by appended claims, and are intended to include any modifications within the scopes and meanings equivalent to the description of the scopes of the claims.

In addition to the axial fan, a sirocco fan, a turbo fan, or the like may be used as the internal blower 9 disposed inside the casing 4.

Further, the sirocco fans may be attached to respective rotary shafts projecting respectively from the left and right ends of the motor.

Thus, the internal blower long in the axial direction can be obtained with the fans on both sides of the motor.

Further, although the fluid inside the casing is configured to be air, other fluids may be used.

Furthermore, although the controller for controlling the internal blower 9 is built in the cell monitoring module 12, the controller may be provided in the junction box 130, or outside of the casing 4.

Moreover, although the radiating plate 32 disposed contacting to the cells 3 or the heat radiating bus bars 11 electrically connected to the cells 3 is adopted as the heat radiation means in order to radiate heat from the sides 8 of the cells 3 in the embodiment, the side 8 of the cell 3 itself may be adopted as the heat radiation means. Alternatively, these heat radiation means may be combined together.

Next, although the plurality of cells 3 is arranged side by side facing each other, it is not necessary to face each other. Further, it is not necessary to be arranged side by side. It is only necessary to forcibly circulate the air inside the casing to cool the plurality of cells 3 evenly.

Further, the unevenness may be provided not only on the outer surface of the casing, but on the inner surface of the casing.

Figure 12A:
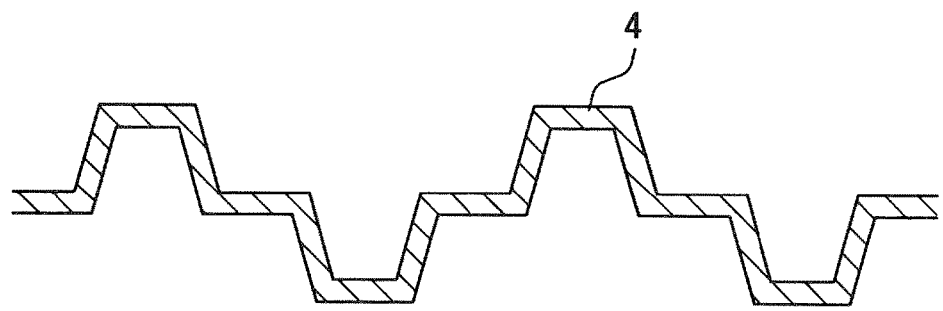
FIGS. 12A and 12B show partial cross-sectional views of a casing with increased heat radiation areas by providing unevenness on an inner surface and an outer surface of the casing in other embodiments of the present disclosure.
Figure 12B:
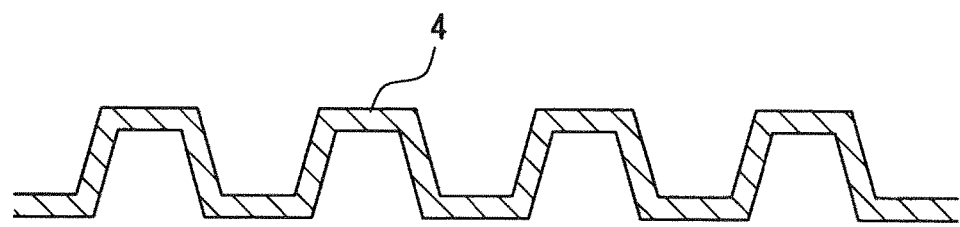

FIGS. 12A and 12B show the casing with increased heat radiation areas by providing unevenness on the inner surface and the outer surface of the casing.

Projections (unevenness) are arranged in a staggered pattern in FIG. 12A. The projections are arranged alternately in FIG. 12B.

The unevenness, for example, may be formed as a strip-form running parallel to the arrow Y12 in FIG. 1. Similarly, the unevenness may be provided on the cover 13.

What is claimed is:

1. A battery pack comprised of a plurality of cells, which forms battery modules, in an internal space of a casing comprising:
   heat radiation means for radiating heat from the cells into the internal space;
   the casing having at least six surfaces;
   the casing surrounding and sealing the cells and the internal space; and
   an internal blower disposed in the casing; wherein,
   the internal blower circulates heat exchange fluid in the casing so as to pass within the casing and a periphery of the cell including the heat radiation means, and the heat is radiated to outside from the inner surface of the casing, wherein,
   one of the six surfaces of the casing comprises a heat dissipation surface;
   the heat dissipation surface is disposed so as to face the heat exchange fluid circulating in the casing at a position closest to an upstream side of the internal blower;
   there is further provided a cover that covers a part of an outer periphery of the casing so that an outer surface of the heat dissipation surface of the casing is covered by the cover with a gap therebetween, the gap defining a flow path;
   an external blower is disposed at one end of the flow path so as to introduce air within the flow path to cool the heat dissipation surface; and
   a DC-DC converter is disposed in a part of the gap, and the DC-DC converter is disposed immediately downstream of the external blower in regards to the flow path so that the DC-DC converter is cooled by the air of the flow path that is introduced by the external blower.

2. The battery pack according to claim 1, wherein, the internal blower circulates the fluid without fluid leaking out of the casing.

3. The battery pack according to claim 1, wherein, the heat radiation means for radiating heat from sides of the cells is composed at least one of a heat radiating plate disposed contacting to the cells, a heat radiating bus bar electrically connected to the cells, or the sides of the cells themselves.

4. The battery pack according to claim 1, wherein, there is further provided a controller for controlling the internal blower;
   the controller controls the internal blower so that the fluid flowing at a first flow rate flows from the internal blower when the temperature of the cell is raised by a self-heating of the cell; and
   the controller controls the internal blower so that the fluid flowing at a second flow rate with larger flow rate than the first flow rate flows from the internal blower when lowering the temperature of the cell.

5. The battery pack according to claim 4, wherein, the second flow rate is larger than a predetermined flow rate.

6. The battery pack according to claim 4, wherein the first flow rate and the second flow rate are determined based on the current by the cell.

7. The battery pack according to claim 4, wherein the first flow rate and the second flow rate are determined based on the current of the cell and an outside air temperature.

8. The battery pack according to claim 1, wherein, the gap is formed between the cover that covers one of the six surfaces of the casing and the surfaces of the casing.

9. A battery pack comprised of a plurality of cells, which forms battery modules, in an internal space of a casing comprising:
   a heat radiator configured to radiate heat from the cells into the internal space;
   the casing having at least six surfaces;
   the casing surrounding and sealing the cells and the internal space; and
   an internal blower disposed in the casing; wherein:
   the internal blower circulates heat exchange fluid in the casing so as to pass within the casing and a periphery of the cell including the heat radiator, and the heat is radiated to outside from the inner surface of the casing;
   one of the six surfaces of the casing comprises a heat dissipation surface;
   the heat dissipation surface is disposed so as to face the heat exchange fluid circulating in the casing at a position closest to an upstream side of the internal blower;
   the battery pack further comprises:
     a cover that covers a part of an outer periphery of the casing so that an outer surface of the heat dissipation surface of the casing is covered by the cover with a gap therebetween, the gap defining a flow path, and
     an external blower is disposed at one end of the flow path so as to introduce air within the flow path to cool the heat dissipation surface, wherein,
     a DC-DC converter is disposed in a part of the gap, and the DC-DC converter is disposed immediately downstream of the external blower in regards to the flow path so that the DC-DC converter is cooled by the air of the flow path that is introduced by the external blower.

10. The battery pack according to claim 9, wherein the heat radiator comprises a plurality of bent heat radiating bus bars.

11. The battery pack according to claim 9, wherein the heat radiator comprises a plurality of bent heat radiating bus bars which are respectively made of conductive metal plates and configured to electrically connect adjoining cells.

12. The battery pack according to claim 9, wherein the heat radiator comprises a plurality of bent heat radiating bus bars which are bent so as to project away from the cells.

13. The battery pack according to claim 9, further comprising:
    a controller for controlling the internal blower at a flow rate determined based on a temperature of the cell.

14. The battery pack according to claim 9, further comprising:
    a controller configured to control the internal blower at a flow rate determined based on a current of the cell.

15. The battery pack according to claim 9, further comprising:
    a controller configured to control the internal blower at a flow rate determined based on a current of the cell and an outside air temperature.

* * * * *